C. F. LJUNGDAHL.
PROCESS OF MANUFACTURING LUTE, PUTTY, AND THE LIKE.
APPLICATION FILED JAN. 28, 1911.

1,078,864.  Patented Nov. 18, 1913.

Witnesses  Inventor

UNITED STATES PATENT OFFICE.

CARL FERDINAND LJUNGDAHL, OF GOTTENBORG, SWEDEN.

PROCESS OF MANUFACTURING LUTE, PUTTY, AND THE LIKE.

1,078,864.  Specification of Letters Patent.  Patented Nov. 18, 1913.

Application filed January 28, 1911. Serial No. 605,279.

*To all whom it may concern:*

Be it known that I, CARL FERDINAND LJUNGDAHL, citizen of Sweden, residing at Gottenborg, Sweden, have invented new and useful Improvements in Processes of Manufacturing Lute, Putty, and the like, of which the following is a specification.

This invention relates to processes of manufacturing lute, putty, and similar preparations.

Lute and putty as hitherto prepared are produced in such a manner, that at first a suitable kind of meal and water are boiled to a paste, which is then allowed to cool, after which ground chalk and linseed oil are added to the cold paste in suitable quantities. Putty prepared in this way possesses however very little durability and if kept in stock becomes decomposed after quite a short time. This is due to the fact that the mass when permitted to stand gives off water which collects above the mass-proper while said mass-proper is dry and hard. Experiment has demonstrated that the giving off of water by the mass is increased when the chalk used is wet before the preparation of the mixture. It is thus impossible to keep such preparations for any long time in stock, and hence they must be manufactured in no larger quantity than that required for immediate use.

The object of this invention is to avoid the inconveniences mentioned and the invention consists in a process for manufacturing lute, putty and similar preparations of such a quality, that they may be kept in stock for a practically unlimited time.

In carrying the invention into effect I boil suitable proportions of meal, water, whiting and linseed oil together at a suitable high temperature. As an example from actual practice I mix 220 lbs. boiling water with 20 lbs. wheat flour and while the mass is boiling I add 45 lbs. boiled linseed oil and then 100 lbs. ground chalk, and let the boiling go on uninterruptedly for one to three hours at a temperature which, depending upon the required quality of the product manufactured, may eventually be increased up to some 300 degrees centigrade.

According to the purpose for which the preparation is to be used the above mentioned quantities of chalk, oil, meal, and water may be varied so as to obtain any desired consistency.

The manufacture preferably takes place in an apparatus of the construction shown on the inclosed drawing, in which—

Figure 1:
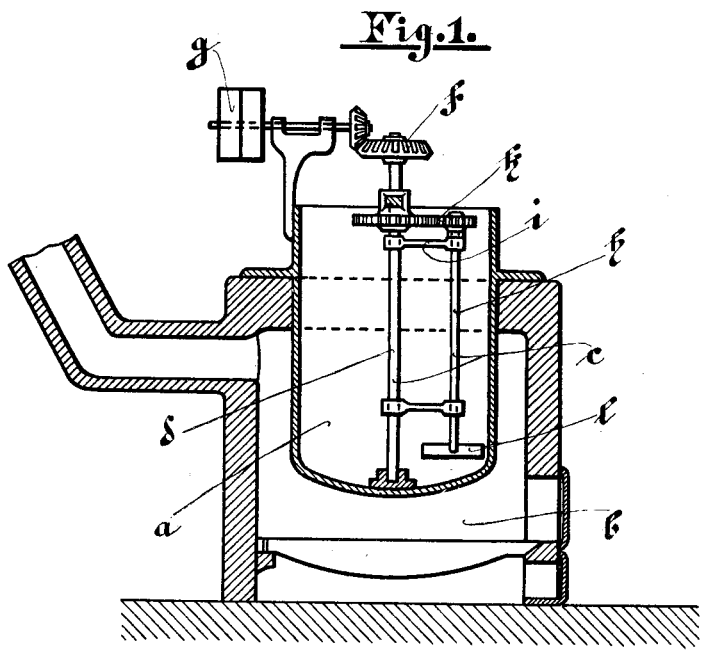
Figure 2:
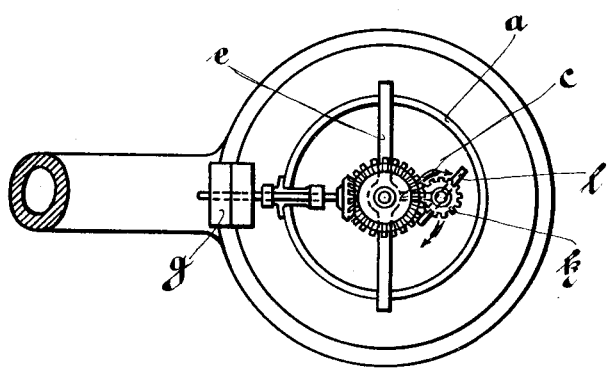

Figure 1 represents a vertical, sectional view and Fig. 2 a plan view.

A suitable cylindrical vessel $a$ is placed above a furnace $b$ and provided with a mixing apparatus $c$ which for instance may be arranged as follows: A vertical shaft $d$ is mounted in the center of the vessel in suitable bearings and is at its top connected with a driving arrangement $g$ through bevel gear $f$ or the like. A second shaft $h$ is arranged at the side of the shaft $d$ and carried by arms $i$ projecting from the shaft $d$ in such a way that the revolution of the shaft $d$ will swing the shaft $h$ around in the vessel and simultaneously revolve it by means of the toothed wheels $k$. In this way the mass will be mixed by wings $l$ at the lower end of the shaft $h$.

The preparation is manufactured as follows: Meal, preferably wheat flour, and cold water are mixed together to the consistency of porridge. Whiting and cold boiled linseed oil are also rubbed together. A sufficient quantity of water is then brought to boil in the vessel $a$ after which the meal porridge is poured therein, during the revolution of the mixing apparatus $c$. Then the oil and whiting is added thereto during mixing and boiling. When all the oil and whiting is added, the boiling continues with uninterrupted mixing and the temperature is somewhat increased through forcing up the fire. After one to three hours, depending upon the required quality of the product, the boiling is stopped, and the product is ready. Owing to the high boiling point of the mixture its temperature will be increased exceedingly above the boiling point of water under atmospheric pressure. After all the water has been evaporated it is possible to raise the temperature to the extent mentioned in the above example.

Because of the meal being surrounded by the oil and the whiting the increasing of the temperature up to some 300° centigrade, if so required, is possible without burning the meal.

Practice has shown that, even if the water is reduced to a minimum, moisture will be given off by preparation if manufactured as hitherto in the cold way. But practice has also shown that the only way to prevent this separating of water is to boil the ingredients as here described because crushed or powdered chalk tends to absorb water when kept in a damp place. By the high degree of heating according to this invention saponifying of the oil and the chalk is brought about which raises the durability of the composition in a material degree.

It has been found in practice that preparations manufactured as above described may be kept in stock for any length of time without impairing their serviceability. It has also been found that such prepared products stand a good deal of transportation so that they are suitable for exportation. It has been found convenient to sell the preparations in two stages of manufacture viz. the one as ready for use and the other as a half product. By half product is meant that the product when delivered from the factory is too thin to be used as a putty—i. e., it contains too much oil in proportion to the meal and chalk. It must therefore, when it is to be used, be mixed with chalk or whiting until it is of the consistency desired.

Having now particularly described and ascertained the nature of my said invention, and in what manner the same is to be performed, I declare that what I claim is:

The herein described process of manufacturing lute, putty and the like, which consists in boiling flour in water, adding boiled linseed oil and ground chalk to the boiling mixture, and continuing the boiling of the whole for one to three hours and increasing the temperature of the whole during the boiling thereof.

In testimony whereof I have hereunto set my hand in presence of two subscribing witnesses.

CARL FERDINAND LJUNGDAHL.

Witnesses:
CARL AUGUST SWEDBERG,
ALGOT HJALMAR JACKSON.

---

Copies of this patent may be obtained for five cents each, by addressing the "Commissioner of Patents, Washington, D. C."